(12) United States Patent
Scheps

(10) Patent No.: US 6,795,455 B2
(45) Date of Patent: Sep. 21, 2004

(54) ALL SOLID-STATE RGB AND WHITE LIGHT GENERATOR

(75) Inventor: Richard Scheps, Rancho Santa Fe, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 207 days.

(21) Appl. No.: 09/929,301

(22) Filed: Aug. 14, 2001

(65) Prior Publication Data

US 2003/0035447 A1 Feb. 20, 2003

(51) Int. Cl.[7] .................................................. H01S 3/10
(52) U.S. Cl. ............................................. 372/21; 372/23
(58) Field of Search ...................... 372/21–23, 32, 372/7, 6, 41, 20; 348/750; 359/618; 52/302.1

(56) References Cited

U.S. PATENT DOCUMENTS

| | | | | |
|---|---|---|---|---|
| 3,818,129 A | * | 6/1974 | Yamamoto | 348/754 |
| 4,866,720 A | * | 9/1989 | Holly | 372/23 |
| 4,949,348 A | * | 8/1990 | Nguyen et al. | 372/41 |
| 5,067,134 A | * | 11/1991 | Oomen | 372/6 |
| 5,226,049 A | * | 7/1993 | Grubb | 372/6 |
| 5,276,695 A | | 1/1994 | Scheps | |
| 5,295,143 A | | 3/1994 | Rao et al. | |
| 5,400,173 A | * | 3/1995 | Komine | 359/330 |
| 5,436,919 A | * | 7/1995 | Chwalek et al. | 372/7 |
| 5,528,612 A | | 6/1996 | Scheps | |
| 5,541,946 A | | 7/1996 | Scheps | |
| 5,640,405 A | * | 6/1997 | Wallace et al. | 372/21 |
| 5,644,584 A | * | 7/1997 | Nam et al. | 372/20 |
| 5,682,397 A | | 10/1997 | Scheps | |
| 5,737,347 A | | 4/1998 | Scheps et al. | |
| 5,740,190 A | * | 4/1998 | Moulton | 372/23 |
| 5,749,190 A | * | 5/1998 | Williams | 52/302.1 |
| 5,787,102 A | * | 7/1998 | Alexander et al. | 372/22 |
| 5,894,489 A | * | 4/1999 | Halldorsson et al. | 372/23 |
| 5,952,681 A | | 9/1999 | Chen | |
| 5,994,722 A | | 11/1999 | Averbeck et al. | |
| 6,134,050 A | * | 10/2000 | Conemac | 359/618 |
| 6,208,673 B1 | * | 3/2001 | Miyake | 372/22 |
| 6,233,025 B1 | * | 5/2001 | Wallenstein | 348/750 |
| 6,304,237 B1 | * | 10/2001 | Karakawa | 345/84 |
| 6,480,325 B1 | * | 11/2002 | Batchko et al. | 359/330 |
| 6,613,042 B1 | * | 9/2003 | Tankovich et al. | 606/10 |
| 6,636,537 B2 | * | 10/2003 | Takada | 372/23 |

* cited by examiner

Primary Examiner—Don Wong
Assistant Examiner—Tuan N. Nguyen
(74) Attorney, Agent, or Firm—Andrew J. Cameron; Michael A. Kagan; Peter A. Lipovsky

(57) ABSTRACT

The present invention has applications in the field of color displays, including computer monitors, video games, television, and other applications that may require a variety of light wavelengths. In one aspect of the invention, a light generator can generate light having selected proportions of red, green, and blue wavelengths from a single source of blue light. In a specific embodiment, the light generator includes a blue laser for generating a first beam of blue light. In another aspect of the invention, beamsplitters are used to split the beam of blue light into separate beams to generate light having a single color in each beam. In one such embodiment, upconversion lasers are used to generate each of the single colors.

50 Claims, 3 Drawing Sheets

# ALL SOLID-STATE RGB AND WHITE LIGHT GENERATOR

BACKGROUND OF THE INVENTION

The present invention relates generally to devices for generating visible light from a laser. More specifically, but without limitation thereto, the present invention relates to a device for generating red, green, and blue (RGB) light.

SUMMARY OF THE INVENTION

The present invention has applications in the field of color displays, including computer monitors, video games, television, and other applications that may require a variety of light wavelengths.

In one aspect of the invention, a light generator can generate light having selected proportions of red, green, and blue wavelengths from a single source of blue light.

In another aspect of the invention, beamsplitters are used to split the beam of blue light into separate beams to generate light having a single color in each beam. Upconversion lasers may be used to generate each of the single colors. The colors may be red, green, and blue, respectively. The light generator may include a first beamsplitter optically coupled to the blue laser for splitting a second beam of blue light from the first beam of blue light, a second beamsplitter optically coupled to the first beamsplitter for splitting a third beam of blue light from the first beam of blue light, a first upconversion laser optically coupled to the second beamsplitter for generating a beam of green light from the first beam of blue light, and a second upconversion laser optically coupled to the second beamsplitter for generating a beam of red light from the third beam of blue light.

In a further aspect of the invention, beamsplitters are used to split a beam of blue light into separate beams to generate light having one or more colors in each separate beam. In a specific embodiment, one beam may have the colors of red and green. The light generator may include a blue laser for generating a first beam of blue light, a first beamsplitter optically coupled to the blue laser for splitting a second beam of blue light from the first beam of blue light, and an upconversion laser optically coupled to the first beamsplitter for generating a beam of red light and a beam of green light from the first beam of blue light.

In another aspect of the invention, the light generator generates a single collinear beam containing multiple colors from a single beam of blue light. The colors may be red, green, and blue. The light generator may include a blue laser for generating a beam of blue light and an upconversion laser optically coupled to the blue laser for generating a beam of red light and a beam of green light from the beam of blue light.

BRIEF DESCRIPTION OF THE DRAWINGS

The above and other aspects, features and advantages of the present invention will be more apparent from the following more specific description thereof, presented in conjunction with the following drawings wherein.

Corresponding reference characters indicate corresponding elements throughout the several views of the drawings.

DESCRIPTION OF SOME EMBODIMENTS

The present invention has applications in the field of color displays, including computer monitors, video games, television, and other applications that may require a variety of light wavelengths.

In one aspect of the invention, a light generator can generate light having selected proportions of red, green, and blue wavelengths from a single source of blue light. In a specific embodiment, the light generator includes a blue laser for generating a first beam of blue light.

Figure 1:
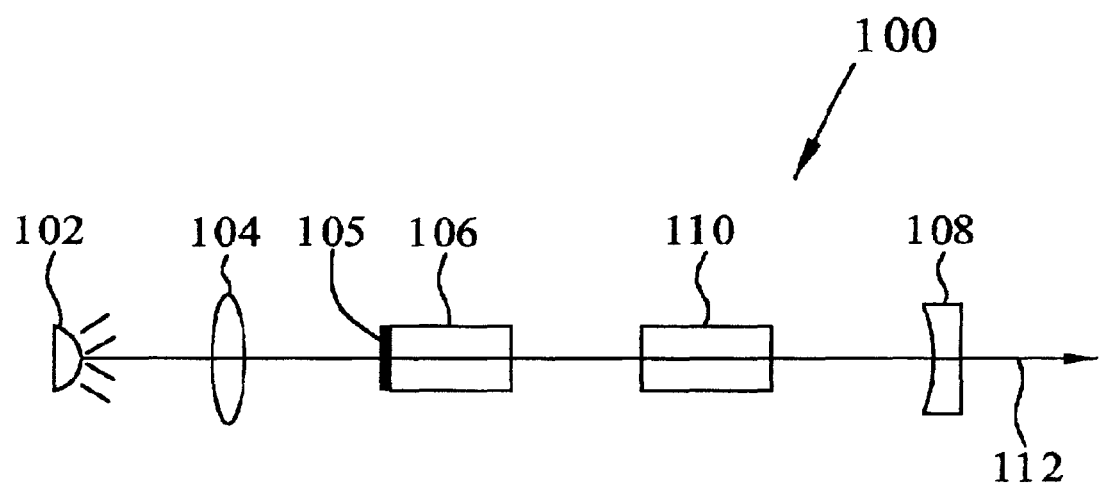
FIG. 1 is a diagram of a solid-state blue laser for generating blue light in accordance with the prior art.

FIG. 1 is a diagram of a prior art solid-state blue laser 100 for generating blue light. Shown in FIG. 1 are a laser diode 102, a focusing lens 104, an input coupler 105, a laser gain element 106, an output coupler 108, a frequency doubler 110, and a beam of blue light 112.

The laser diode 102 may be, for example, an AlGaAs laser emitting light at a wavelength of 808 nm in the near infrared. The laser diode 102 pumps the laser gain element 106, which may be, for example, a cylindrically shaped Nd:YAG crystal producing a laser wavelength of 946 nm, a length of about 5 mm, and a diameter of about 3 mm. The focusing lens 104 focuses the near infrared pump energy from the laser diode 102 through the input coupler 105 onto the laser gain element 106. The input coupler 105 may be, for example, a plane mirror or a reflective coating on a face of the laser gain element 106 adjacent to the focusing lens 104 that is transmissive at the wavelength of the near infrared pump energy output from the laser diode 102 and is reflective at the laser wavelength of the laser gain element 106.

The output coupler 108 may be, for example, a concave mirror. The output coupler 108 is preferably partially reflective, for example, between 10% and 99% reflective, at the second harmonic of the laser wavelength of the laser gain element 106. The output coupler 108 totally reflects and focuses the light generated by the laser gain element 106 back to the laser gain element 106. The output coupler 108 may also reflect the near infrared pump energy of the laser diode 102 that is not absorbed by the laser gain element 106 back to the laser gain element 106 to increase optical efficiency.

The light generated by the laser gain element 106 is optically coupled to the frequency doubler 110. The frequency doubler 110 may be, for example, a cylindrically shaped beta-barium borate (BBO) crystal with anti-reflective coatings on both end faces that are highly transmissive of the light generated by the laser gain element 106. Typical dimensions for the frequency doubler 110 are 3 mm in diameter and 5 mm in length. The frequency doubler 110 converts the fundamental wavelength of light produced by the gain element 106 to the second harmonic to produce the beam of blue light 112. In this example, the wavelength of the blue light is about 473 nm. The beam of blue light 112 output from the blue laser 100 may be used in conjunction with each of the embodiments described below to construct a solid-state RGB light generator.

Figure 2:
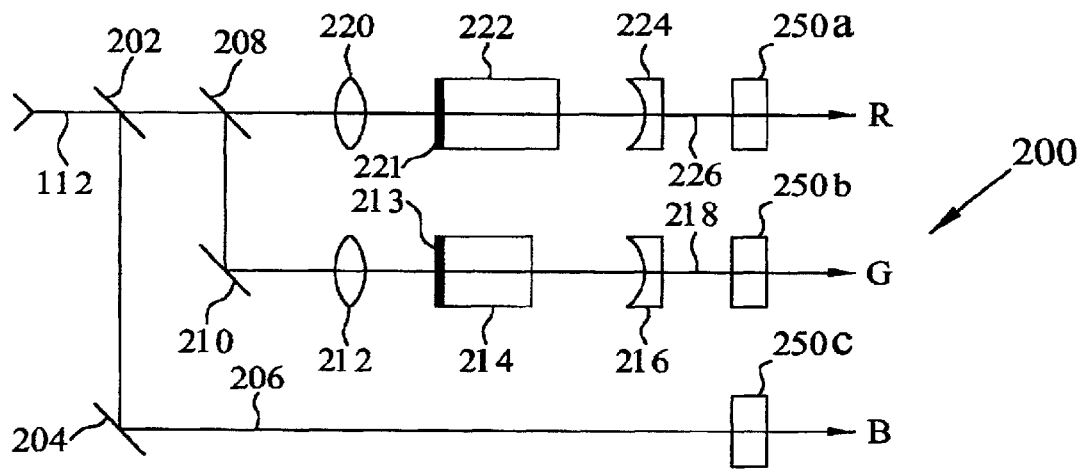
FIG. 2 is a diagram of a light generator with two upconversion lasers according to an embodiment of the present invention.

FIG. 2 is a diagram of a light generator 200 with two upconversion lasers. Shown in FIG. 2 are a first beam of blue light 112, a first beamsplitter 202, a first mirror 204, a second beam of blue light 206, a second beamsplitter 208, a second mirror 210, a first upconversion laser, a second upconversion laser, a beam of green light 218, a beam of red light 226, and optical modulators 250a, 250b, and 250c. Upconversion lasers are well known in the art and light generator 200 may include any suitable process of photon absorption followed by emission, where the energy of the upper laser level is higher than the photon energy. By way of example, the first upconversion laser is shown, in FIG. 2, as including a first focusing lens 212, a first input coupler 213, a first upconversion laser gain element 214, and a first output coupler 216. The second upconversion laser is shown, in FIG. 2, as including a second focusing lens 220, a second input coupler 221, a second upconversion laser gain element 222, and a second output coupler 224.

The first beamsplitter 202 may be a 90%–10% beamsplitter, i.e., 90 percent transmissive, 10 percent reflective. An example of a beamsplitter that may be used for the first beamsplitter 202 that is commercially available from numerous suppliers is a flat quartz plate coated with a dichroic coating. The first beamsplitter 202 reflects about 10% of the first beam of blue light 112 to become the second beam of blue light 206 and directs the second beam of blue light 206 to the first mirror 204.

The first mirror 204 directs the second beam of blue light 206 in a direction approximately parallel to the first beam of blue light 112. The first mirror 204 and the second mirror 210 may be, for example, plane mirrors or internally reflecting prisms.

The second beamsplitter 208 may be a 50%–50% beamsplitter similar in construction to the first beamsplitter 202, however, the composition of the dichroic coating is selected to reflect about 50% of the first beam of blue light 112 transmitted by the first beamsplitter 202 to the second mirror 210. The second mirror 210 directs the portion of the first beam of blue light 112 reflected by the second beamsplitter 208 to the first focusing lens 212. The first focusing lens 212 focuses the portion of the first beam of blue light 112 reflected from the second mirror 210 through the input coupler 213 onto the laser gain element 214.

The first input coupler 213 may be, for example, a plane mirror or a reflective coating on a face of the first upconversion laser gain element 214 adjacent to the first focusing lens 212. The first input coupler 213 is transmissive at blue wavelengths and reflective at the green laser wavelength of the first upconversion laser gain element 214.

The first output coupler 216 may be, for example, a concave mirror that partially reflects and focuses the green light generated by the first upconversion laser gain element 214 back into the first upconversion laser gain element 214. The first output coupler 216 may also reflect the portion of the first beam of blue light 112 that is not absorbed by the first upconversion laser gain element 214 to increase optical efficiency and to avoid mixing blue light with the beam of green light 218.

The first upconversion laser gain element 214 may be, for example, a cylindrically shaped $Pr^{3+}$-doped $YALO_3$ (Pr:YALO) crystal having a length of about 1 cm and a diameter of about 0.6 cm. The first upconversion laser gain element 214 generates red light at a wavelength of about 644 nm and green light at a wavelength of about 520 nm from the portion of the first beam of blue light 112 reflected by the second beamsplitter 208 and the second mirror 210. Because the first input coupler 213 and the first output coupler 216 reflect green light in multiple passes through the first upconversion laser gain element 214, the first upconversion laser gain element 214 generates green light almost exclusively. The beam of green light 218 exits from the first output coupler 216.

The second focusing lens 220 focuses the portion of the first beam of blue light 112 transmitted by the second beamsplitter 208 through the second input coupler 221 onto the second upconversion laser gain element 222. The second input coupler 221 may be, for example, a plane mirror or a reflective coating on a face of the second upconversion laser gain element 222 adjacent to the second focusing lens 220. The second input coupler 221 transmits the portion of the first beam of blue light 112 transmitted by the second beamsplitter 208 and reflects red light generated by the second upconversion laser gain element 222.

The second output coupler 224 may be, for example, a concave mirror that partially reflects and focuses the red light generated by the second upconversion laser gain element 222 back into the second upconversion laser gain element 222. The second output coupler 224 may also reflect blue light that is not absorbed by the second upconversion laser gain element 222 to increase optical efficiency and to avoid mixing blue light with the beam of red light 226.

The second upconversion laser gain element 222 may be, for example, a $Pr^{3+}$-doped $YALO_3$ (Pr:YALO) crystal. The second upconversion laser gain element 222 generates red and green light from the beam of blue light 112. Because the second input coupler 221 and the second output coupler 224 reflect red light in multiple passes through the second upconversion laser gain element 222, the second upconversion laser gain element 222 generates red light almost exclusively. The beam of red light 226 exits from the second output coupler 224.

The optical modulators 250a, 250b, and 250c may be, for example, readily available acousto-optical modulators optically coupled to the beam of red light 226, the beam of green light 218, and the second beam of blue light 206 respectively to vary the intensity of each RGB color. A wavelength dispersive device (not shown), such as a diffraction grating or a prism, may be used to combine the beam of red light 226, the beam of green light 218, and the second beam of blue light 206 into a single beam of an RGB color, including white, according to well known techniques.

Figure 3:
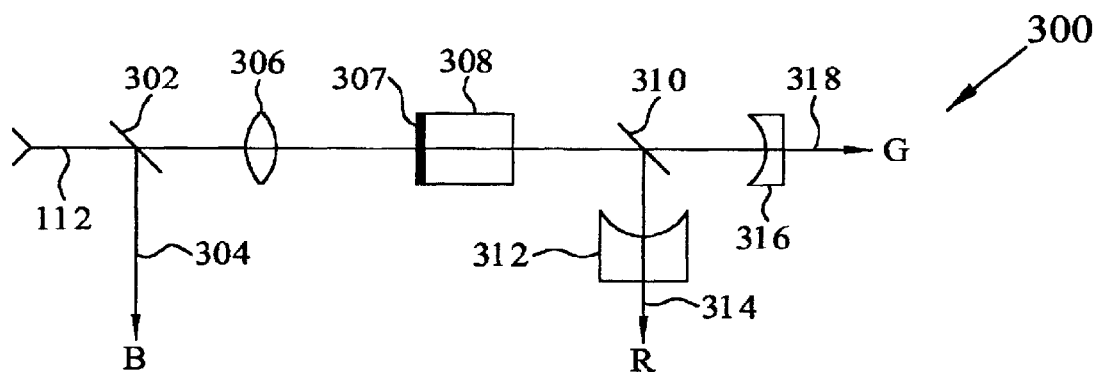
FIG. 3 is a diagram of a light generator with a single upconversion laser according to another embodiment of the present invention.

FIG. 3 is a diagram of an RGB light generator 300 with a single upconversion laser. Shown in FIG. 3 are a first beam of blue light 112, a beamsplitter 302, a second beam of blue light 304, an upconversion laser, a beam of red light 314, and a beam of green light 318. Upconversion lasers are well known in the art and light generator 300 may include any suitable process of photon absorption followed by emission, where the energy of the upper laser level is higher than the photon energy. By way of example, the upconversion laser is shown, in FIG. 3, as including a focusing lens 306, an input coupler 307, an upconversion laser gain element 308, a wave selective element 310, a first output coupler 312, and a second output coupler 316.

The beamsplitter 302 may be a 90%-10% beamsplitter similar to the beamsplitter 202 described above for FIG. 2. The beamsplitter 302 splits the second beam of blue light 304 from the first beam of blue light 112 and transmits the greater portion of the blue light to the focusing lens 306. The focusing lens 306 focuses the first beam of blue light 112 through the input coupler 307 onto the laser gain element 308.

The input coupler 307 may be, for example, a plane mirror or a reflective coating on a face of the upconversion laser gain element 308 adjacent to the focusing lens 306. The input coupler 307 transmits blue light and reflects red and green light generated by the upconversion laser gain element 308.

The upconversion laser gain element 308 may be, for example, a $Pr^{3+}$-doped $YALO_3$ (Pr:YALO) crystal that generates red and green light from blue light similar to the upconversion laser gain element 214 or 222 in FIG. 2. Because the input coupler 307 and the output couplers 312 and 316 reflect both red and green light in multiple passes through the upconversion laser gain element 308, the upconversion laser gain element 308 generates red and green light almost exclusively.

The wavelength selective element 310 may be, for example, a flat quartz plate coated with a dichroic coating that is commercially available from numerous suppliers, or a prism. The wavelength selective element 310 directs the red light generated by the upconversion laser gain element 308 to the first output coupler 312 and the green light generated by the upconversion laser gain element 308 to the second output coupler 316.

The first output coupler 312 may be, for example, a concave mirror that is partially reflective, for example, between 10% and 99% reflective, at the red laser wavelength of the laser gain element 308. The first output coupler 312 partially reflects and focuses the red light generated by the upconversion laser gain element 308 back into the upconversion laser gain element 308, and the output beam of red light 314 exits from the first output coupler 312.

The second output coupler 316 may be, for example, a concave mirror that is partially reflective, for example, between 10% and 99% reflective, at the green laser wavelength of the laser gain element 308. The second output coupler 316 partially reflects and focuses the green light generated by the upconversion laser gain element 308 back into the upconversion laser gain element 308, and the beam of green light 318 exits from the second output coupler 316.

Optical modulators (not shown) similar to optical modulators 250a, 250b, and 250c described above for FIG. 2 may be optically coupled to the beam of red light 314, the beam of green light 318, and the second beam of blue light 304 to vary the intensity of each RGB color according to well known techniques.

Figure 4:
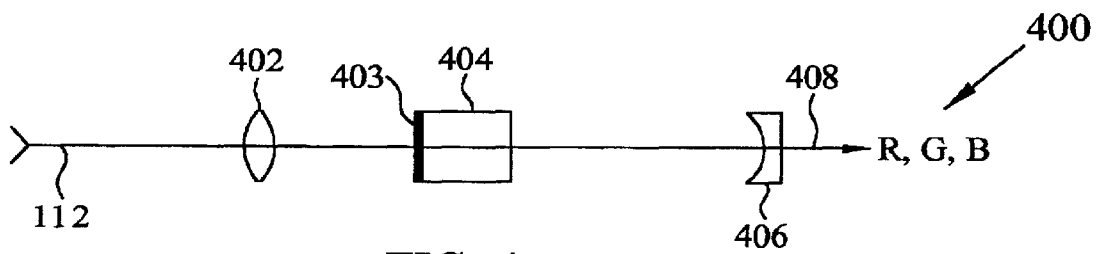
FIG. 4 is a diagram of a light generator for generating collinear beams of red, green, and blue light according to a further embodiment of the present invention.

FIG. 4 is a diagram of an RGB light generator 400 for generating beams of red, green, and blue light that are collinear. Shown in FIG. 4 are a first beam of blue light 112, an upconversion laser, and collinear beams 408 of blue light, red light, and green light. Upconversion lasers are well known in the art and light generator 400 may include any suitable process of photon absorption followed by emission, where the energy of the upper laser level is higher than the photon energy. By way of example, the upconversion laser is shown, in FIG. 4, as including a focusing lens 402, an input coupler 403, an upconversion laser gain element 404, and an output coupler 406.

The focusing lens 402 focuses the first beam of blue light 112 through the input coupler 403 onto the laser gain element 404. The input coupler 403 may be, for example, a plane mirror or a reflective coating on a face of the upconversion laser gain element 404 adjacent to the focusing lens 402. The input coupler 403 transmits the input beam of blue light 112 and reflects red and green light generated by the upconversion laser gain element 404.

The upconversion laser gain element 404 may be, for example, a $Pr^{3+}$-doped $YALO_3$ (Pr:YALO) crystal that generates red and green light from the first beam of blue light 112 similar to the upconversion laser gain element 308 in FIG. 3. Because the input coupler 403 and the output coupler 406 are reflective at both the red and green wavelengths, the upconversion laser gain element 404 generates both red and green light.

The output coupler 406 may be, for example, a concave mirror that is partially reflective, for example, between 10% and 99% reflective, at the red and green laser wavelengths of the laser gain element 404, and is also highly transmissive at the blue wavelength. This may be accomplished using a dichroic coating on the concave mirror according to techniques well known in the art. The output coupler 406 partially reflects and focuses light at the red and green laser wavelengths back into the upconversion laser gain element 404, and the collinear beam of blue, red, and green light 408 exits from the output coupler 406.

Figure 5:
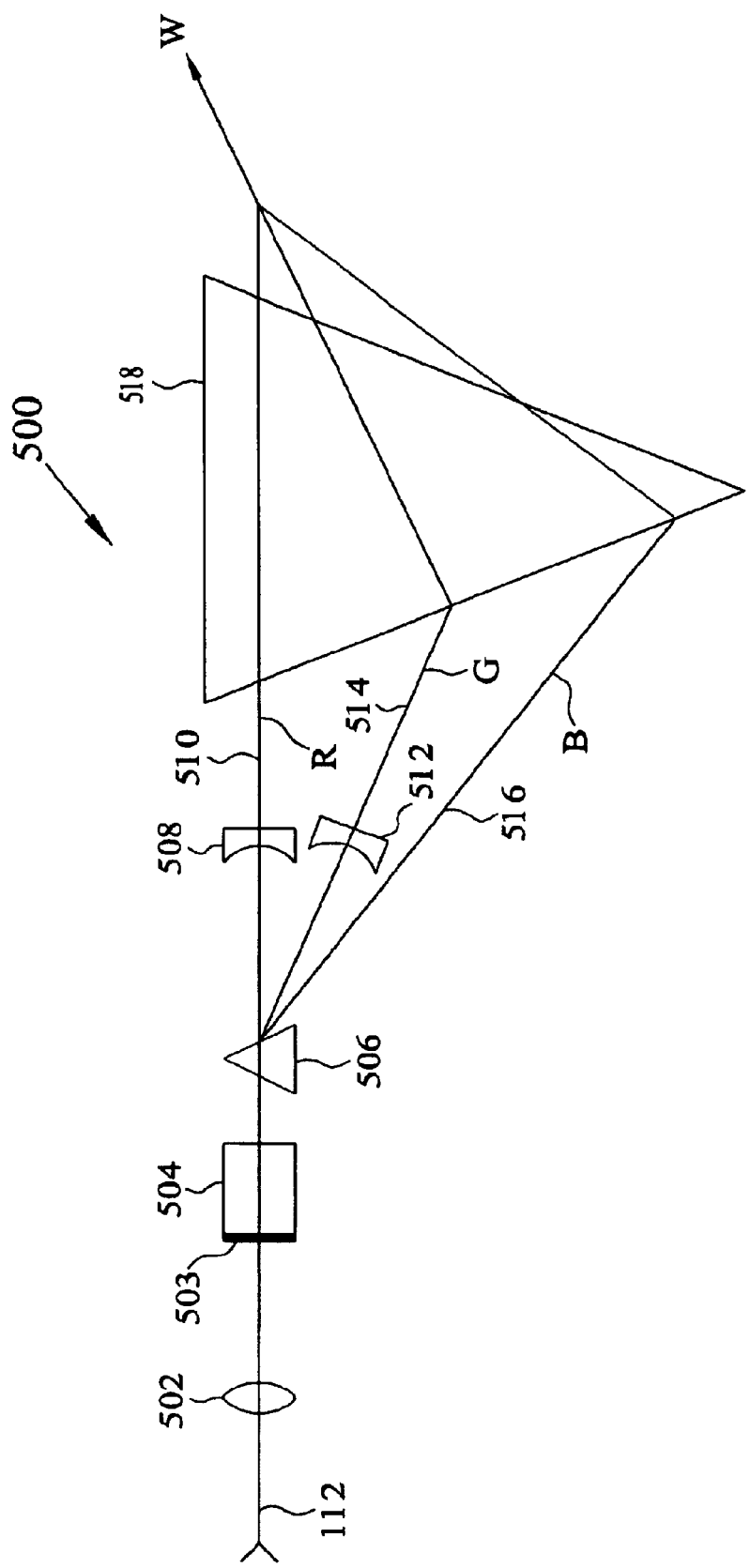
FIG. 5 is a diagram of a light generator for generating separate beams of red, green, and blue light and combining the separate beams to form a collinear beam of combined light according to an additional embodiment of the present invention.

FIG. 5 is a diagram of an RGB light generator 500 for generating separate beams of red, green, and blue light. The RGB light generator 500 combines the separate beams to form a collinear beam of combined red, green, and blue light. Shown in FIG. 5 are a first beam of blue light 112, an upconversion laser, a beam of red light 510, a beam of green light 514, a beam of blue light 516, and a collinear beam of combined red, green, and blue light 520. Upconversion lasers are well known in the art and light generator 500 may include any suitable process of photon absorption followed by emission, where the energy of the upper laser level is higher than the photon energy. By way of example, the upconversion laser is shown, in FIG. 5, as including a focusing lens 502, an input coupler 503, an upconversion laser gain element 504, a first wavelength selective element 506, a first output coupler 508, a second output coupler 512, and a second wavelength selective element 518.

The focusing lens 502 focuses the first beam of blue light 112 through the input coupler 503 onto the laser gain element 504. The input coupler 503 may be, for example, a plane mirror or a reflective coating on a face of the upconversion laser gain element 504 adjacent to the focusing lens 502. The input coupler 503 transmits blue light and reflects red and green light generated by the upconversion laser gain element 504.

The upconversion laser gain element 504 may be, for example, a $Pr^{3+}$-doped $YALO_3$ (Pr:YALO) crystal that generates red and green light from blue light similar to the upconversion laser gain element 308 in FIG. 3. Because the input coupler 503 and the first output coupler 508 reflect red light, and because the input coupler 503 and the second output coupler 512 reflect green light, the upconversion laser gain element 504 generates red and green light.

The first wavelength selective element 506 and the second wavelength selective element 518 may be, for example, a diffraction grating, a dichroic mirror, or a prism. The wavelength selective element 506 separates the red light and the green light generated by the upconversion laser gain element 504 and the portion of the first beam of blue light 112 that is not absorbed by the upconversion laser gain element 504.

The first output coupler 508 may be, for example, a concave mirror that is partially reflective, for example, between 10% and 99% reflective, at the red laser wavelength of the laser gain element 504. The first output coupler 508 partially reflects and focuses light at the red laser wavelength back into the upconversion laser gain element 504, and the beam of red light 510 exits from the first output coupler 508.

The second output coupler 512 may be, for example, a concave mirror that is partially reflective, for example, between 10% and 99% reflective, at the green laser wavelength of the laser gain element 504. The second output coupler 512 partially reflects and focuses green light back into the upconversion laser gain element 504, and the beam of green light 514 exits from the second output coupler 512.

Optical modulators (not shown) may be optically coupled to the beam of red light 510, the beam of green light 514, and the beam of blue light 516 to vary the intensity of each color as described above for FIG. 2 according to well known techniques.

The second wavelength selective element 518 combines the beam of red light 510, the beam of green light 514, and the second beam of blue light 516 to form the collinear beam of combined red, green, and blue light 520. The color of the collinear beam of combined red, green, and blue light 520 may be selected by varying the intensity of each color to generate any color, including white.

The RGB light generator embodied in FIGS. 2, 3, 4, and 5 may be made entirely from solid state components as described above to generate light beams of red, green, blue, white, and any other color or combination of colors for a variety of applications including color displays requiring an RGB generator that is light, portable, and shock-resistant.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A light generator comprising:
    a blue laser for generating a first beam of blue light;
    a first beamsplitter optically coupled to the blue laser for splitting a second beam of blue light from the first beam of blue light;
    a second beamsplitter optically coupled to the first beamsplitter for splitting a third beam of blue light from the first beam of blue light;
    a first upconversion laser optically coupled to the second beamsplitter for generating a beam of green light from the third beam of blue light; and
    a second upconversion laser optically coupled to the second beamsplitter for generating a beam of red light from the first beam of blue light;
    wherein at least one of the blue laser, the first upconversion laser, and the second upconversion laser is a solid-state laser;
    wherein each of the first and second upconversion lasers comprises:
        a laser gain element;
        a focusing lens optically coupled to the laser gain element for focusing blue light onto the laser gain element;
        an input coupler optically coupled to the focusing lens for transmitting blue light and for reflecting red light or green light; and
        an output coupler optically coupled to the laser gain element for totally reflecting light generated by the laser gain element back to the laser gain element;
    wherein the laser gain element is a Pr:YALO crystal.

2. The light generator of claim 1 wherein the output coupler reflects pump energy that is not absorbed by the laser gain element back to the laser gain element to increase optical efficiency.

3. The light generator of claim 1 wherein the input coupler is a plane mirror or a reflective coating on an end face of the laser gain element adjacent to the focusing lens.

4. The light generator of claim 1 further comprising a mirror optically coupled to the first beamsplitter for directing the second beam of blue light in a direction substantially parallel to the first beam of blue light.

5. The light generator of claim 1 further comprising a mirror optically coupled to the second beamsplitter for directing the third beam of blue light in a direction substantially parallel to the first beam of blue light.

6. The light generator of claim 1 further comprising at least one optical modulator to modulate at least one of the second beam of blue light, the beam of green light, and the beam of red light.

7. The light generator of claim 1 further comprising a wavelength selective device optically coupled to the first beamsplitter, the first upconversion laser, and the second upconversion laser for combining the beam of red light, the beam of green light, and the second beam of blue light into a single beam of combined red, green, and blue light.

8. The light generator of claim 7 the wherein the single beam of combined red, green, and blue light is substantially white.

9. The light generator of claim 7 wherein the wavelength selective device is a prism or a diffraction grating.

10. A light generator comprising:
    a blue laser for generating a first beam of blue light;
    a first beamsplitter optically coupled to the blue laser for splitting a second beam of blue light from the first beam of blue light; and
    an upconversion laser optically coupled to the first beamsplitter for generating a beam of red light and a beam of green light from the first beam of blue light;
    wherein at least one of the blue laser and the upconversion laser is a solid-state laser;
    wherein the upconversion laser comprises:
        a laser gain element for generating a beam of red light and a beam of green light from the first beam of blue light;
        a focusing lens optically coupled to the laser gain element for focusing the first beam of blue light onto the laser gain element; and
        an input coupler optically coupled to the focusing lens for transmitting blue light and for reflecting red and green light;
    wherein the laser gain element is a Pr:YALO crystal.

11. The light generator of claim 10 wherein the input coupler comprises a plane mirror or a reflective coating on an end face of the laser gain element.

12. The light generator of claim 10 wherein the upconversion laser comprises a wavelength selective element optically coupled to the laser gain element for separating the beam of red light and the beam of green light.

13. The light generator of claim 12 further comprising an output coupler optically coupled to the laser gain element to partially reflect the beam of red light or the beam of green light.

14. The light generator of claim 13 further comprising an optical modulator to modulate at least one of the second beam of blue light, the beam of green light, and the beam of red light.

15. A light generator comprising:
    a blue laser for generating a first beam of blue light; and
    an upconversion laser optically coupled to the blue laser for generating a beam of red light and a beam of green light from the first beam of blue light;

wherein at least one of the blue laser and the upconversion laser is a solid-state laser;
wherein the upconversion laser comprises:
a laser gain element;
a focusing lens optically coupled to the laser gain element for focusing blue light onto the laser gain element;
an input coupler optically coupled to the focusing lens for transmitting blue light and for reflecting red and green light; and
an output coupler optically coupled to the laser gain element for partially reflecting red and green light and transmitting blue light;
wherein the laser gain element is a Pr:YALO crystal.

16. The light generator of claim 15 wherein the first beam of blue light, the beam of red light, and the beam of green light are combined into a single collinear beam.

17. The light generator of claim 16 wherein the single collinear beam is substantially white.

18. The light generator of claim 15 wherein the input coupler comprises either a plane mirror or a reflective coating on an end face of the laser gain element.

19. The light generator of claim 15 wherein the upconversion laser comprises a first wavelength selective element optically coupled to the laser gain element for separating the red light and the green light.

20. The light generator of claim 19 wherein the first wavelength selective element is either a prism or a diffraction grating.

21. The light generator of claim 19 wherein the output coupler optically coupled to the first wavelength selective element to partially reflect red light or green light.

22. The light generator of claim 21 wherein the output coupler reflects blue light to increase optical efficiency of the laser gain element.

23. The light generator of claim 21 further comprising a modulator to modulate at least one of the second beam of blue light, the beam of green light, and the beam of red light.

24. The light generator of claim 21 wherein the upconversion laser comprises a second wavelength selective element optically coupled to the output coupler for combining at least two of the beam of red light, the beam of green light, and the beam of blue light into a single beam of combined light.

25. The light generator of claim 24 wherein the single beam of combined light is substantially white.

26. A light generator comprising:
means for generating a first beam of blue light;
means for splitting a second beam of blue light from the first beam of blue light;
means for splitting a third beam of blue light from the first beam of blue light;
means for generating a beam of green light from the third beam of blue light; and
means for generating a beam of red light from the first beam of blue light;
wherein at least one of the means for generating is a solid-state laser;
wherein each of the means for generating a beam of green light and the means for generating a beam of red light comprises:
a laser gain element;
means for focusing blue light onto the laser gain element;
means for transmitting blue light and for reflecting red light or green light produced by the laser gain element; and
means for partially reflecting light generated by the laser gain element back to the laser gain element;
wherein the laser gain element is a Pr:YALO crystal.

27. The light generator of claim 26 wherein the means for partially reflecting light generated by the laser gain element back to the laser gain element reflects pump energy that is not absorbed by the laser gain element back to the laser gain element to increase optical efficiency.

28. The light generator of claim 26 wherein the means for transmitting blue light and for reflecting red light or green light produced by the laser gain element is a plane mirror or a reflective coating on an end face of the laser gain element adjacent to the focusing lens.

29. The light generator of claim 26 further comprising means for directing the second beam of blue light in a direction substantially parallel to the first beam of blue light.

30. The light generator of claim 26 further comprising means for directing the third beam of blue light in a direction substantially parallel to the first beam of blue light.

31. The light generator of claim 26 further comprising means for modulating light optically coupled to at least one of the second beam of blue light, the beam of green light, and the beam of red light.

32. The light generator of claim 26 further comprising means for combining the beam of red light, the beam of green light, and the second beam of blue light into a single beam of combined red, green, and blue light.

33. The light generator of claim 32 wherein the single beam of combined red, green, and blue light is substantially white.

34. The light generator of claim 32 wherein the means for combining is a prism or a diffraction grating.

35. A light generator comprising:
means for generating a first beam of blue light;
means for splitting a second beam of blue light from the first beam of blue light;
means for generating a beam of red light from the first beam of blue light; and
means for generating a beam of green light from the first beam of blue light;
wherein at least one of the means for generating is a solid-state laser;
wherein the means for generating a beam of red light and a beam of green light from the first beam of blue light comprises:
a laser gain element;
means for focusing the first beam of blue light onto the laser gain element; and
means for transmitting blue light and for reflecting red and green light produced by the laser gain element;
wherein the laser gain element is a Pr:YALO crystal.

36. The light generator of claim 35 wherein the means for transmitting comprises a plane mirror or a reflective coating on an end face of the laser gain element.

37. The light generator of claim 35 wherein the means for generating a beam of red light and a beam of green light comprises means for separating the beam of red light and the beam of green light.

38. The light generator of claim 37 further comprising means for partially reflecting the beam of red light or the beam of green light.

39. The light generator of claim 38 further comprising means for modulating at least one of the second beam of blue light, the beam of green light, and the beam of red light.

40. A light generator comprising:
means for generating a first beam of blue light and a second beam of blue light;

means for generating a beam of red light from the first beam of blue light; and means for generating a beam of green light from the first beam of blue light;

wherein at least one of the means for generating is a solid-state laser;

wherein the means for generating comprises:
  a laser gain element;
  means for focusing blue light onto the laser gain element;
  means for transmitting the blue light and for reflecting red and green light produced by the laser gain element; and
  means for partially reflecting the red and green light produced by the laser gain element and for transmitting blue light;

wherein the laser gain element is a Pr:YALO crystal.

41. The light generator of claim 40 wherein the second beam of blue light, the beam of red light, and the beam of green light are combined into a single collinear beam.

42. The light generator of claim 41 wherein the single collinear beam is substantially white.

43. The light generator of claim 40 wherein the means for transmitting comprises either a plane mirror or a reflective coating on an end face of the laser gain element.

44. The light generator of claim 40 wherein the means for generating a beam of red light and a beam of green light from the first beam of blue light comprises means for separating the red light and the green light.

45. The light generator of claim 44 wherein the means for separating the red light and the green light is either a prism or a diffraction grating.

46. The light generator of claim 43 wherein the means for partially reflecting the red and green light produced by the laser gain element and for transmitting blue light is optically coupled to the means for separating the red light and the green light to partially reflect only one of the red light or the green light.

47. The light generator of claim 46 wherein the means for partially reflecting the red and green light produced by the laser gain element and for transmitting blue light reflects blue light to increase optical efficiency of the laser gain element.

48. The light generator of claim 46 further comprising means for modulating at least one of the second beam of blue light, the beam of green light, and the beam of red light.

49. The light generator of claim 46 wherein the means for generating a beam of red light and a beam of green light comprises means for combining at least two of the beam of red light, the beam of green light, and the beam of blue light into a single beam of combined light.

50. The light generator of claim 49 wherein the single beam of combined light is substantially white.

* * * * *